(12) United States Patent
Powers et al.

(10) Patent No.: US 8,862,803 B2
(45) Date of Patent: Oct. 14, 2014

(54) MEDIATING COMMUNCIATION OF A UNIVERAL SERIAL BUS DEVICE

(75) Inventors: Judson Powers, Ithaca, NY (US);
Matthew P. Donovan, Trumansburg, NY (US); Frank N. Adelstein, Ithaca, NY (US); Michael Kentley, Bend, OR (US);
Stephen K. Brueckner, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 367 days.

(21) Appl. No.: 13/149,634

(22) Filed: May 31, 2011

(65) Prior Publication Data

US 2012/0311207 A1 Dec. 6, 2012

(51) Int. Cl.
*G06F 9/00* (2006.01)
*G06F 11/00* (2006.01)
*G06F 13/42* (2006.01)
(52) U.S. Cl.
CPC ..................................... *G06F 13/42* (2013.01)
USPC ............... 710/313; 710/306; 710/314; 726/3; 726/11; 726/13; 726/22; 726/24
(58) Field of Classification Search
USPC ........... 710/306, 313–314; 726/11, 13, 22–25
See application file for complete search history.

(56) References Cited

U.S. PATENT DOCUMENTS

| | | | |
|---|---|---|---|
| 7,024,548 B1* | 4/2006 | O'Toole, Jr. ...................... 713/1 |
| 7,748,040 B2* | 6/2010 | Adelstein et al. ............... 726/25 |
| 7,788,425 B2* | 8/2010 | Ikemoto .......................... 710/36 |
| 8,011,013 B2* | 8/2011 | Bacastow ....................... 726/27 |
| 8,209,739 B2* | 6/2012 | Terpening et al. ................ 726/1 |
| 8,230,149 B1* | 7/2012 | Long et al. .................... 710/305 |
| 8,402,528 B1* | 3/2013 | McCorkendale et al. ...... 726/11 |
| 8,646,082 B2* | 2/2014 | Lomont et al. .................. 726/24 |
| 2006/0191004 A1* | 8/2006 | Alcouffe ......................... 726/14 |
| 2008/0005415 A1* | 1/2008 | Lopez et al. .................... 710/62 |
| 2009/0249464 A1* | 10/2009 | Chang et al. .................... 726/11 |
| 2010/0146307 A1* | 6/2010 | Griffin et al. ................. 713/300 |
| 2011/0088093 A1* | 4/2011 | Kang et al. ...................... 726/22 |
| 2012/0042099 A1* | 2/2012 | Wong et al. ...................... 710/9 |
| 2012/0117280 A1* | 5/2012 | Ballot et al. .................... 710/17 |
| 2012/0240234 A1* | 9/2012 | Lomont et al. .................. 726/24 |

FOREIGN PATENT DOCUMENTS

WO    WO 2011004020 A2 *  1/2011

* cited by examiner

*Primary Examiner* — Brian Misiura
(74) *Attorney, Agent, or Firm* — Shumaker & Sieffert, P.A.

(57) ABSTRACT

An apparatus for mediating communication between a universal serial bus (USB) device and a host computing device is described. In an example, the apparatus includes a USB host interface configured to be connected to a downstream USB device, and a USB device interface configured to be connected to an upstream host computing device. The apparatus also includes a mediation module positioned between the USB host interface and the USB device interface and configured to determine whether the USB device is authorized to communicate with the host computing device.

33 Claims, 10 Drawing Sheets

MEDIATING COMMUNCIATION OF A UNIVERAL SERIAL BUS DEVICE

This invention was made with government support under W9113M-11-C-0073 awarded by the U.S. Department of Defense. The government has certain rights in the invention.

TECHNICAL FIELD

This disclosure relates to universal serial bus devices.

BACKGROUND

Computing devices (e.g., personal computers, mobile telephones, electronic handheld devices, gaming consoles, or other similar devices) may communicate with a variety of periphery devices using a Universal Serial Bus (USB) connection. The USB connection may also provide power to the peripheral devices. Some examples of peripheral devices that may use a USB connection include mice, keyboards, digital cameras, printers, personal media players, mass storage devices such as flash drives, network adapters, and external hard drives. For many of those devices, USB has become the standard connection method.

SUMMARY

In general, this disclosure is directed to mediating communication between a host computing device and a universal serial bus (USB) device. In particular, the techniques of this disclosure generally include determining whether a USB device is authorized to communicate with a host computing device. For example, aspects of this disclosure include identifying a USB device using an identifying characteristic and determining whether the identified USB device is authorized to communicate with a particular host computing device. The determination may be made, for example, by comparing the identified USB device to a stored set of authorized USB devices. If the identified USB device is not authorized to communicate with the host computing device, aspects of this disclosure include inhibiting the identified USB device from communicating with the host computing device.

The techniques of this disclosure also generally include determining whether a USB device is properly communicating with a host computing device. In particular, the techniques of this disclosure generally include determining whether a USB device is authorized to execute certain commands with respect to the host computing device, whether the USB device has the appropriate USB descriptors, and the like. Aspects of this disclosure include inhibiting the USB device from communicating with the host computing device if the USB device is not communicating properly with the host computing device.

In an example, an apparatus includes a universal serial bus (USB) host interface configured to be connected to a downstream USB device and a USB device interface configured to be connected to an upstream host computing device. The apparatus also includes a mediation module positioned between the USB host interface and the USB device interface and configured to determine whether the USB device is authorized to communicate with the host computing device. When the mediation module determines that the USB device is authorized to communicate with the host computing device, the mediation module is configured to translate one or more messages between the USB host interface and the USB device interface.

In another example, a method includes receiving a message from a universal serial bus (USB) device as a host computing device and determining whether the USB device is authorized to communicate with the host computing device based on contents of the message. The method also includes translating the message, when the USB device is authorized to communicate with the host computing device, to the host computing device as the USB device.

In another example, a system includes a universal serial bus (USB) device, a USB host device, and a USB firewall. The USB firewall may be configured to receive one or more messages from the USB device and to determine whether the USB device is authorized to communicate with the USB host device based at least partially on the contents of the one or more messages. The USB firewall may also be configured to, when the USB firewall determines that the USB device is authorized to communicate with the USB host device, operate as a proxy to receive the one or more messages as the USB host device, and translate the one or more messages by presenting the one or more messages to the USB host device as the USB device.

The details of one or more aspects of the disclosure are set forth in the accompanying drawings and the description below. Other features, objects, and advantages of the disclosure will be apparent from the description and drawings, and from the claims.

DETAILED DESCRIPTION

In general, this disclosure is directed to mediating communication between a host computing device and a universal serial bus (USB) device. As described herein, "mediating" refers generally to acting as an intermediary between a host computing device and a USB device. Thus, the term "mediating" is not intended to be limiting, and may comprise a variety of data generation, translation, verification, and/or other functions to facilitate communication between the host computing device and the USB device.

Figure 1:
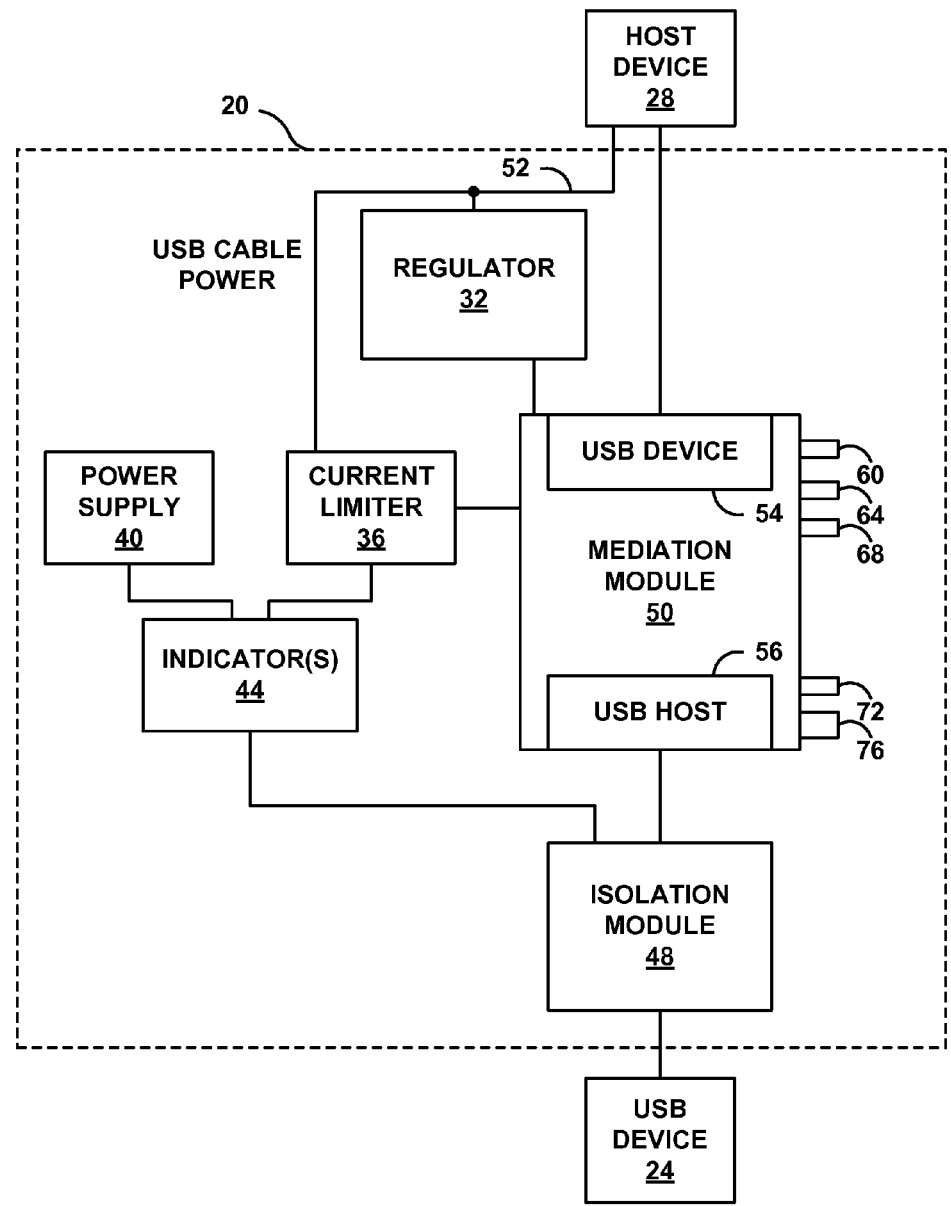
FIG. 1 is a block diagram illustrating an example system for mediating communication between a universal serial bus (USB) device and a host computing device, in accordance with one example of this disclosure.

FIG. 1 is a block diagram illustrating an example apparatus 20 for mediating communication between a universal serial bus (USB) device 24 and a host computing device 28, in accordance with one example of this disclosure. In the example shown in FIG. 1, the apparatus 20 operates as a USB hardware firewall that includes a regulator 32, a current limiter 36, a power supply 40, one or more indicators 44, an isolation module 48, and a mediation module 50. The apparatus 20 is provided merely for purposes of example. That is, the techniques for mediation communication described in this disclosure may be performed by a variety of other systems, having more or fewer components than those shown in FIG. 1.

In the example shown in FIG. 1, apparatus 20 for mediating communication is electronically coupled between USB device 24 and host device 28. The USB device 24 and host device 28 are generally configured to communicate according to a common USB communication specification, and apparatus 20 operates as a USB firewall with respect to the communications. USB device 24 may, for example, communicate with host device 28 according to the USB 2.0 specification, as revised on Jul. 26, 2010, available publically at http://www.usb.org/developers/docs/usb_20_021411.zip, which is incorporated herein in its entirety by reference. In other examples, USB device 24 and host device 28 may be configured to communicate according to another USB specification, such as USB 3.0, released Nov. 12, 2008, available publically at http://www.usb.org/developers/docs/usb_30_spec_020411d.zip, or other standards or proprietary communication specifications that are currently available or may emerge in the future. In addition, USB device 24 may be powered by host device 28. That is, for example, host device 28 may include a power supply that powers USB device 24 when USB device is connected to host device 28.

In general, USB device 24 may include a wide variety of peripheral electronic devices. In some examples, USB devices 24 can be organized according to various device classes. That is, USB device 24 may include a variety of display devices (e.g., a monitor), communication devices (e.g., a modem), audio devices (e.g., one or more speakers), mass storage devices (e.g., a flash drive or hard drive), or human interface devices (e.g., a mouse, keyboard, or the like). This listing of USB devices 24 is not intended to be exhaustive, and the techniques of this disclosure may be performed using a variety of other USB devices.

Host device 28 may include any device that is capable of hosting USB device 24. That is, typically, host device 28 includes a USB receptacle that is capable of receiving a USB plug associated with USB device 24, or vice versa. Examples of host device 28 include a wide variety of computing devices, including personal computing devices, mobile telephones, electronic handheld devices, gaming consoles, or other electronic devices.

In the example shown in FIG. 1, apparatus 20 is powered from a power connector 52 associated with host device 28. The power from power connector 52 is split and provided to regulator 32 and current limiter 36. According to aspects of this disclosure, regulator 32 uses the power from power connector 52 to provide a regulated voltage to mediation module 50. In some examples, regulator 32 provides a 3.3 volt regulated voltage to mediation module 50.

As noted above, current limiter 36 is also connected to power connector 52 of host device 28. In some examples, host device 28 may include certain integrated functions which prevent USB device 24 from drawing too much current by disabling the connection with USB device 24 if such a condition is detected. According to aspects of this disclosure, current limiter 36 may replace such functionality of host device 28 so that USB device 24 does not cause host device 28 to remove power from apparatus 20. That is, for example, current limiter 36 may prevent an attached device, such as USB device 24, from drawing so much power that the attached device causes host device 28 to disable power associated with power connector 52. Instead, if USB device 24 draws an excessive amount of current, current limiter 36 may disable USB device 24 while apparatus 20 remains powered by power connector 52.

In the example shown in FIG. 1, apparatus 20 includes power supply 40. According to some aspects of the disclosure, power supply 40 may be configured as a DC voltage source. For example, power supply 40 may provide a 5 volt power supply that supplies additional power to USB devices connected to apparatus 20, such as USB device 24. In some examples, power supply 40 is only routed to USB device 24, and is not supplied to mediation module 50, which is powered by the host device 28. Power supply 40 may provide the necessary power to support charging of USB device 24, for example, according to a charging standard defined in the USB specification.

In other examples, apparatus 20 may not include power supply 40. In such examples, USB device 24 may only receive power from host device 28 (e.g., via apparatus 20). In this example, apparatus 20 may not provide enough power to charge USB device 24. That is, for example, if power supply 40 is not available, apparatus 20 may only be capable of supplying 300-400 milliamps (mA) to USB device 24, which may not be enough to support charging.

Indicators 44 may provide status information to a user of apparatus 20. For example, according to some aspects of this disclosure, indicators may include one or more light emitting diodes (LEDs) that indicate whether USB device 24 is connected to apparatus 20 and powered and/or whether USB device 24 is functioning properly. In examples in which more than one USB device is connectable to apparatus 20 (as shown and described, for example, with respect to FIG. 3), apparatus 20 may include more than one set of indicators 44, with indicators 44 for each port that accepts a USB device connection. Indicators 44 may also include other LED indicators, such as an LED to indicate with apparatus 20 is powered and functioning properly, and/or whether apparatus 20 requires external power (e.g., from power supply 40). Although described with respect to LEDs, it should be understood that a variety of devices may be implemented in apparatus 20 to provide a variety of indications to a user regarding the status of apparatus 20, USB device 24, and/or host device 28. For example, apparatus 20 may additionally or alternatively include any combination of lights, displays (e.g., a seven segment LED display, a liquid crystal display (LCD), or the like), buzzers, or other devices capable of indicating a status of system, USB device 24, and/or host device 28.

According to some examples, isolation module 48 and mediation module 50 may be highly integrated, but illustrated separately for conceptual purposes. Isolation module 48 may be configured to isolate apparatus 20 from USB device 24 in the event that USB device 24 is not authorized to communicate with host device 28, or in the event that USB device 24 is malfunctioning or identified as being a potential security threat. That is, isolation module 48 may be responsible for terminating power to USB device 24 in the event that USB device 24 is not authorized to communicate with host device 28, or in the event that USB device 24 is malfunctioning or identified as being a potential security threat.

Isolation module 48 may also determine whether a device, such as USB device 24 is connected to apparatus 20. For example, isolation module 48 may determine whether a device is connected to apparatus 20 by measuring capacitance. That is, isolation module 48 may determine that there is no device connected to apparatus 20 when measuring little or no capacitance, and may determine that there is a device connected to apparatus 20 when measuring more than a nominal amount of capacitance.

In the example shown in FIG. 1, mediation module 50 includes a USB device interface 54 and a USB host interface 56. Mediation module 50 also includes a number of interfaces for peripheral connection, including a general purpose input/output ("GPIO") connection 60, 12C (or "Inter IC") connection 64, and a serial peripheral interface (SPI) connection 68. In addition, mediation module 50 includes a joint test action group ("JTAG") adaptor 72, which may be used for debugging purposes, and a pushbutton 76. In other examples, mediation module 50 may include more or fewer components that those shown in FIG. 1. As an example, as shown and described with respect to FIG. 2, mediation module 50 may include memory and components for configuration. In other examples, mediation module 50 may not include one or more of the interfaces for peripheral connection.

In general, mediation module 50 may be configured to enable apparatus 20 to mediate communication between USB device 24 and host device 28. In the example shown in FIG. 1, mediation module 50 is connected to host device 28 via USB device interface 54, while mediation module 50 is also connected to USB device 24 via USB host interface 56. That is, for example, USB device interface 54 may be configured to connect to the upstream host device 28 as if mediation module 50 was USB device 24. In addition, USB host interface 56 may be configured to connected to the downstream USB device 24 as if mediation module 50 was host device 28.

By interposing mediation module 50 between host device 28 and USB device 24 in this way, mediation module 50 may translate messages between host device 28 and USB device 24 without either device being aware of the presence of mediation module 50. That is, for example, host device 28 may detect, or "see" mediation module 50 as a typical USB device, while USB device 24 may detect, or "see" mediation module 50 as a typical USB host. Thus, mediation module 50 may receive commands and messages from host device 28 via USB device interface 54 and transmit the commands and messages to USB device 24 via USB host interface 56 as if mediation module 50 was host device 28. In addition, mediation module 50 may receive commands and messages from USB device 24 and transmit the commands and messages to host device 28 as if mediation module 50 was USB device 24. In some examples, mediation module 50 may perform packet processing operations to deliver messages to USB device 24 or host device 28 as if mediation module 50 was host device 28 or USB device 24, respectively. For example, mediation module 50 may process and/or generate header data (e.g., token packets), while leaving payload data unchanged.

According to aspects of this disclosure, in operation, mediation module 50 may be responsible for determining whether USB device 24 is authorized to communicate with host device 28. Alternatively or additionally, mediation module 50 may be responsible for determining whether USB device 24 is communicating properly with host device 28. Accordingly, in general, mediation module 50 may enable apparatus 20 to operate as a type of firewall device in that permits or denies transmissions between host device 28 and USB device 24 based upon a set of rules, and may be used to protect host device 28 from unauthorized access by USB devices 24 while permitting legitimate communications to pass.

To determine whether USB device 24 is authorized to communicate with host device 28, mediation module 50 may initially examine an identifying characteristic associated with USB device 24. Mediation module 50 may then determine whether USB device 24 is authorized to communicate with host device 24, for example, by comparing the identifying characteristic associated with USB device 24 to a stored set of authorized identifying characteristics associated with authorized devices.

In some examples, mediation module 50 may determine whether USB device 24 is authorized to communicate with host device 28 using one or more descriptors associated with USB device 24. For example, a USB device 24 commonly includes and utilizes one or more descriptors, which may provide a variety of identifying characteristics of the USB device 24. In an example, a USB device descriptor may include information such as a USB revision with which USB device 24 complies, product identification data, vendor identification data, a serial number, and possible configurations of USB device 24. Other descriptors include configuration descriptors, interface descriptors, endpoint descriptors, and string descriptors.

Mediation module 50 may use any such descriptors to determine identifying characteristics associated with USB device 24 when determining whether USB device 24 is authorized to communicate with host device 28. Moreover, mediation module 50 may use any portion of data contained in the descriptors to determine identifying characteristics associated with USB device 24. In an example, a user of apparatus 20 may only desire host device 28 to communicate with USB devices 24 manufactured by one or more specific vendors. In this example, mediation module 50 may store a list of the vendors for use during an authentication process.

Figure 2:
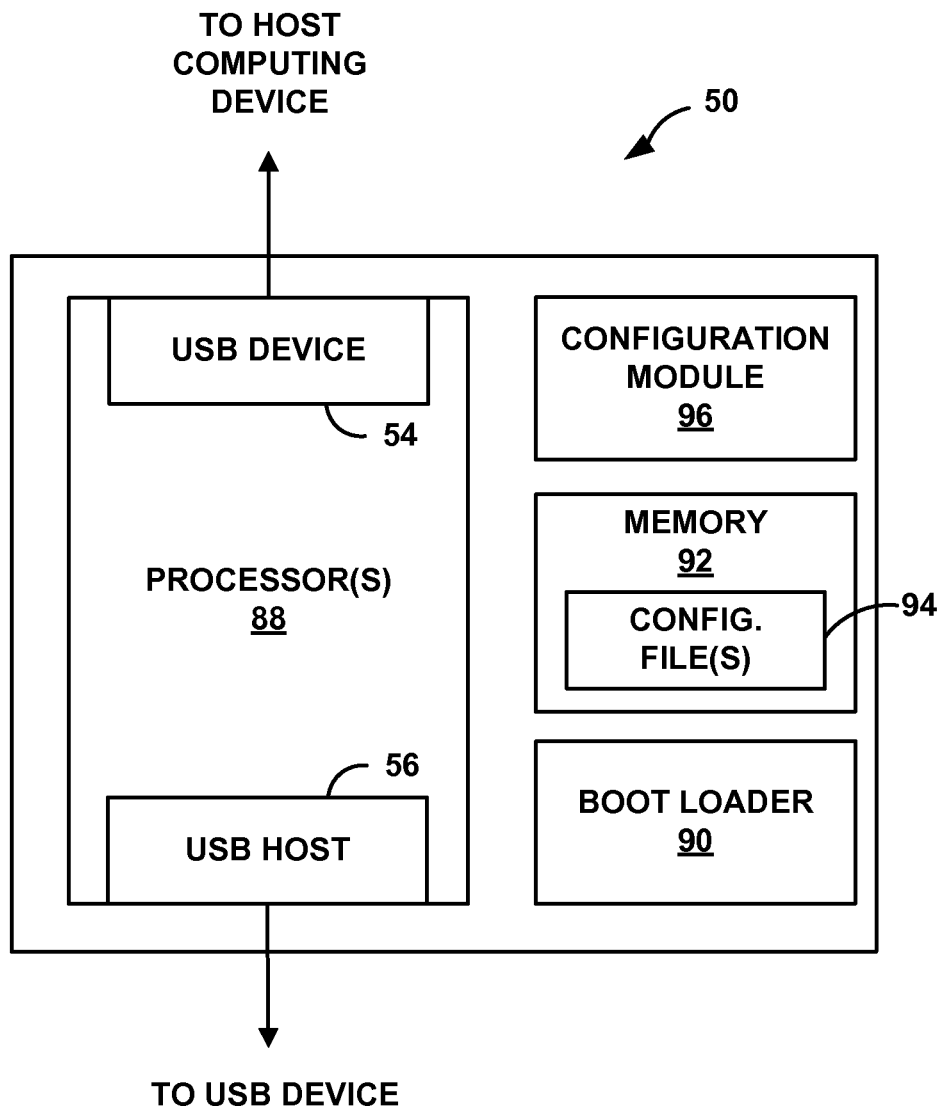
FIG. 2 is a block diagram illustrating another example system for mediating communication between a USB device and a host computing device, in accordance with one example of this disclosure.

According to some examples, as shown described in greater detail with respect to FIG. 2, mediation module 50 may store and read the identifying characteristics of authorized devices in a memory unit (e.g., a non-volatile memory unit). In other examples, however, mediation module 50 may access identifying characteristics from another source. For example, mediation module 50 may access a database of identifying characteristics via a wired or wireless network connection (e.g., an intranet connection, and internet connect, and the like).

To authenticate USB device 24, upon connection to apparatus 20, mediation module 50 may identify USB device 24 using vendor identification data included in a device descriptor associated with USB device 24. Mediation module 50 may then compare the vendor identification information included in the descriptor with the list of authorized vendors. If the vendor of USB device 24 is not included in the authorized vendors, mediation module 50 may prevent USB device 24 from communicating with host device 28. If the vendor of USB device 24 is included in the authorized vendors, however, mediation module 50 may allow USB device 24 to communicate with host device 28.

A user or system administrator may define authentication permissions based on a variety of other factors. For example, a user may determine that only a certain type of device (e.g., a display device, a communication device, an audio device, a storage device, a human interface device) is allowed to communicate with host device 28. In this example, mediation module 50 may store a list of authorize device types, and use such a list to authorize or reject USB devices when connected in the same way described above. In another example, a user may define specific USB devices 24 that are allowed to communicate with host device 28, for example, using serial numbers of USB devices. In this example, mediation module 50 may store a list of authorized serial numbers, and use such a list to authorize or reject USB devices when connected in the same way described above. Again, mediation module 50 may use any or all of the information contained in descriptors associated with USB devices 24 during the authentication process.

As noted above, if mediation module 50 determines that a connected USB device 24 is not authorized to communicate with host device 28, mediation module 50 may prevent the USB device 24 from communicating with host device 28. According to some aspects of the disclosure, for example, mediation module 50 may remove power from USB device 24 using isolation module 48. Mediation module 50 may also send a message to host device 28 indicating that authorization failed.

If mediation module 50 determines that a connected USB device 24 is authorized to communicate with host device 28, mediation module 50 may allow USB device 24 to communicate with host device 28. That is, mediation module 50 may translate messages between USB device 24 and host device 28 without altering the messages. According to some aspects of the disclosure, mediation module 50 may function similarly to a network address translation (NAT) router on an Ethernet network. For example, mediation module 50 may translate messages between USB device 24 and host device 28 without altering the contents of the packets that make up the messages. Rather, mediation module 50 may receive messages from the USB device 24 and forward the messages to host device 28. Likewise, mediation module 50 may receive messages from host device 28 and forward the messages to USB device 24. Thus, according to some aspects of the disclosure, the presence and operation of mediation module 50 is transparent to both USB device 24 and host device 28.

As noted above, mediation module 50 may also be responsible for enabling apparatus 20 to determine whether USB device 24 is communicating properly with host device 28. That is, for example, mediation module 50 may be responsible for verifying data transfers between host device 28 and USB device 24. In an example, mediation module 50 may protect host device 28 against protocol attacks from USB device 24, such as eavesdropping, by only forwarding data to a USB device 24 if the data is addressed to USB device 24 by host device 28. That is, USB device 24 is prevented from receiving or copying any data from host device 28 that is not explicitly sent to USB device 24 by host device 28.

Mediation module 50 may also protect against other protocol attacks, such as a denial of service attack. For example, typically, USB device 24 is only required to send data to host device 28 when it is requested by the host device 28. A malicious USB device, however, may send data to host device 28 when it has not been requested. In addition, a malicious USB device may improperly identify itself when sending data to host device 28. Mediation module 50 may identify packets that are sent by USB device 24 at an improper time (e.g., before the packets have been requested) and disable USB device 24. In addition, mediation module 50 may detect whether USB device 24 is identifying itself appropriately, and disable USB device 24 if USB device 24 is not identifying itself appropriately. That is, for example, mediation module 50 may determine whether USB device 24 is sending the appropriate descriptor data to host device 28, and disable USB device 24 if USB device 24 is using the appropriate descriptor data. According to some aspects of the disclosure, mediation module 50 may disable USB device 24 by removing power from USB device 24.

In addition, mediation module 50 may protect host device 28 against certain software based attacks. For example, mediation module 50 may be capable of detecting device emulation and malware propagation. That is, mediation module 50 may detect device emulation by identifying a change in the functionality of a connected USB device 24 without the USB device 24 being physically removed from apparatus 20. Mediation module 50 may also monitor and analyze the contents of the packets communicated between USB device 24 and host device 28. For example, mediation module 50 may identify malformed packets, or packets that contain known malware.

Upon detecting an attack or faulty USB device 24, mediation module 50 may prevent any unauthorized, unexpected, or malformed data (e.g., packets that do not conform to USB specification) from being transmitted to host device 28. In addition, mediation module 50 may disable USB device 24 (e.g., disable by terminating power to USB device 24). According to some examples, as shown and described with respect to FIG. 8, certain functions described with respect to mediation module 50, such as protecting host device 28 from protocol or software based attacks, may be performed by a software module for configuring mediation module 50 that is executed by host device 28.

In addition, apparatus 20 physically separates USB device 24 and host device 28, which may help to mitigate physical and hardware based attacks. That is, by physically interposing apparatus 20 between USB device 24 and host device 28, apparatus 20 may prevent physical attacks, such as voltage overloading by a rogue USB device 24. As noted above, apparatus 20 may also be capable of protecting host device 28 from software based attacks (e.g., device emulation, malware propagation, and the like), as well as protocol based attacks.

According to some aspects of the disclosure, mediation module 50 may include a pushbutton 76, or other device (e.g., a switch, relay, a capacitive touch button, or other user input device), for configuring mediation module 50. In an example, pushbutton 76 may enable a user to configure apparatus 20 by powering up apparatus 20 with pushbutton 76 depressed. Upon powering apparatus 20 up with pushbutton 76 depressed, apparatus 20 may identify itself to host device 28. As shown and described in greater detail with respect to FIG. 8, the user may then load one or more configuration files for use by mediation module 50 (e.g., configuration files containing authorized device information). According to some aspects of the disclosure, if pushbutton 76 is depressed at power up, but no configuration activity occurs within a specified period of time, apparatus 20 may time out and disable the ability to configure apparatus 20. When configuring apparatus 20, attached downstream devices, such as USB device 24, may not be visible to host device 28.

In this way, apparatus 20 is an example system for determining whether a USB device is authorized to communicate with a host computing device, and/or determining whether a USB device is properly communicating with a host computing device. Accordingly, in general, apparatus 20 may operate as a type of firewall device in that permits or denies transmissions between host device 28 and USB device 24 based upon a set of rules, and may be used to protect host device 28 from unauthorized access while permitting legitimate communications to pass.

In other examples, as described in greater detail below with respect to FIGS. 3-7, the aspects and techniques of this disclosure related to mediating communication between a USB device and a host device may be may be incorporated into a variety of other systems and form factors, having more or fewer components than those shown in FIG. 1. Moreover, it should be understood that certain components shown in the apparatus 20 of FIG. 1 may be highly integrated, but illustrated separately for conceptual purposes. That is, in other examples, certain components and/or modules shown in FIG. 1 (and elsewhere in this description) may be functionally integrated. As an example, mediation module 50 may be functionally integrated with isolation module 48.

FIG. 2 is a block diagram illustrating mediation module 50 in greater detail, in accordance with one example, of this disclosure. According to some examples, mediation module 50 may be configured similarly to mediation module 50 shown in FIG. 1, and may be described with respect to other components shown in FIG. 1. It should be understood, however, that mediation module 50 shown in FIG. 2 may be incorporated in a variety of other devices and systems than the apparatus 20 shown in FIG. 1.

In the example shown in FIG. 2, configuration module 50 includes a USB device interface 54, a USB host interface 56, and one or more processors 88. In addition, mediation module 50 includes a boot loader 90, a memory 92 having one or more configuration files 94, and a configuration module 96. In other examples, configuration module 50 may include additional components not shown in FIG. 2 for purposes of clarity. For example configuration module 50 may also include a network module for connecting to a wired or wireless network. Mediation module 50 may also include a variety of user interface devices (such as pushbutton 76 shown in FIG. 1) that allow a user to interact with mediation module 50. Moreover, the components of mediation module 50 shown in FIG. 2 may not be necessary in every example of mediation module 50.

The one or more processors 88 (processor 88) may be configured to implement functionality and/or process instructions for execution within mediation module 50. While referred to herein as a single processing unit, it should be understood that processor 88 may include more than one processing unit. Processor 88 may be capable of processing instructions stored in memory 90 or instructions stored in another storage device. Processor 88 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 88, in this disclosure, may be embodied as software, firmware, hardware or any combination thereof.

In some examples, boot loader 90 may be responsible for initializing mediation module 50 during power up. Boot loader 90 may include a unique encryption key that is placed in boot loader 90 by a manufacturer of mediation module 50. In addition, after placing boot loader 90 in mediation module 50, boot loader 90 may not be changed.

Memory 92 may include any combination of volatile or non-volatile storage. For example, memory 92 may include computer-readable storage medium that is configured to store information within mediation module 50 during operation. Accordingly, memory 92 may also be considered "non-transitory," despite storing data that can change over time. That is, for example, the term "non-transitory" may indicate that the storage medium is not embodied in a carrier wave or a propagated signal. In some examples, memory 92 is a temporary memory, meaning that a primary purpose of memory 92 is not long-term storage. Memory 92 may also, in some examples, be described as a volatile memory, meaning that memory 92 does not maintain stored contents when the computer is turned off. Examples of volatile memories include random access memories (RAM), dynamic random access memories (DRAM), static random access memories (SRAM), and other forms of volatile memories known in the art.

Memory 92 may also include one or more computer-readable storage media configured for long-term storage of information. In some examples, memory 92 may include non-volatile storage elements that may include magnetic hard discs, optical discs, floppy discs, flash memories, or forms of electrically programmable memories (EPROM) or electrically erasable and programmable (EEPROM) memories.

According to some aspects of the disclosure, memory 92 may be configured to store one or more configuration files 94. In some examples, the configuration files 94 define which USB devices (such as USB device 24 shown in FIG. 1) are authorized to communicate with a host device to which mediation module 50 is connected. That is, for example, configuration files 94 may include one or more lists of identifying characteristics of authorized devices.

In addition, memory 92 and/or configuration files 94 may include a variety of other data. For example, memory 92 may store data that allows mediation module 50 to identify malware or other harmful code. Memory 92 may also store an event log, which identifies certain operational events, and when such events occur (e.g., using timestamps). For example, the event log may identify when USB devices are connected or disconnected from mediation module 50. The event log may also identify when unauthorized devices are connected to mediation module 50, and if any malware or other security risks are identified by mediation module 50.

Configuration module 96 may be responsible for event reporting (e.g., generating event messages to be stored in the event log). Configuration module 96 may also be responsible for accepting configuration files, firmware files, or other operational files. In some examples, configuration module 96 may include a wired or wireless network connection, thereby allowing configuration module 96 to receive files from an external source.

According to some aspects of the disclosure, configuration module 96 may be a "captive" or non-detachable USB device within mediation module 50 that provides configuration and management functionality. Accordingly, in some examples, configuration module 96 may implement a Human Interface Device ("HID") protocol to send data to, and receive data from a host device, such as host device 28 (FIG. 1). For example, configuration module 96 may communicate with a USB host using USB HID revision 1.11, available publically at http://www.usb.org/developers/devclass_docs/HID1_11.pdf.

According to some aspects of the disclosure, mediation module 50 may include certain security features. For example, mediation module 50 may include encrypted data channels for routing data between USB device interface 54 and USB host interface 56. Moreover, mediation module 50 may include certain anti-tamper and/or anti-reverse engineering mechanisms. That is, for example, mediation module 50 may be enclosed in an anti-tamper or tamper-evident enclosure. Additionally or alternatively, mediation module 50 may be encased in an epoxy or other resin to prevent component removal or examination. Mediation module 50 may also be void of identifying marks, such as serial numbers or other common identifying marks on electronic components.

In operation, upon powering mediation module 50 on, boot loader 90 may be responsible for determining whether mediation module 50 includes a valid operating system, such as firmware that is executed by processor 88. In some examples, boot loader 90 may also take control of mediation module 50 if mediation module 50 is powered up with a user input device, such as pushbutton 76 (FIG. 1) depressed. In this example, boot loader 90 may then allow host device 28 to configure mediation module 50. For example, boot loader 90 may allow field update tools to communicate with mediation module 50.

Boot loader 90 may also be responsible for passing control to an operating system, such as firmware, after successful boot up. For example, boot loader 90 may check for a valid operating firmware image and may pass control to a valid firmware. In some examples, if boot loader 90 does not detect a valid operating firmware image, boot loader 90 may cause mediation module 50 to connect to host device 28 and wait for a user to download a properly encrypted, valid boot loader 90 to mediation module 50.

After boot up, mediation module 50 may wait for a USB device to attach to USB host interface 56. After a USB device has been attached to USB host interface 56, mediation module 50 may enumerate the attached device, validate the attached device's descriptors, verify that the device is authorized to connect to host device 28, and begin proxy operations (e.g., data translation between USB device 24 and host device 28).

According to some aspects of the disclosure, as described with respect to FIG. 1, mediation module 50 may validate that attached device's descriptors and verify that the device is authorized by comparing the attached device's descriptors to a set of authorized descriptors stored in memory 92. For example, mediation module 50 may use any portion of data contained in the descriptors to determine whether a particular device is authorized to communicate with the host computing device.

If the connected device is not authorized to communicate with the host computing device, mediation module 50 may turn off power to the connected device and indicate that the connected device is not authorized (e.g., using indicators 44 shown in FIG. 1). According to some aspects of the disclosure, mediation module 50 may keep power disabled until the unauthorized attached device has been physically disconnected from mediation module 50. In some examples, mediation module 50 may identify whether a device has been physically disconnected by measuring capacitance at USB host interface 56.

In addition, if the connected device is not authorized to communicate with the host computing device, or if no USB device is connected to mediation module 50, mediation module 50 may appear to the host computing device as a "USB monitoring and security device" or other moniker. In this mode, a user (or code associated with the computing device itself) may communicate with the mediation module 50, for example, using HID class. That is, a user may be able to read and/or clear status logs, download encrypted rules files into memory 92 of mediation module 50, read descriptors of a disallowed device, send commands to attached USB devices, or the like.

If the connected device is authorized to communicate with host computing device, mediation module 50 may enumerate the connected device. For example, mediation module 50 may identify itself to the host computing device as if it were the attached USB device. After enumeration, mediation module 50 may pass all accesses from the host computing device through to the attached device so that mediation module 50 is effectively transparent to both the host computing device and the attached USB device. In this way, mediation module 50 may act as a proxy for attached USB device. For example, mediation module 50 may present an idealized version of the USB device that is attached to mediation module 50 to the host computing device. That is, if a user connects a storage device, such as a flash drive, to mediation module 50, mediation module 50 may present a storage device with the same descriptors, e.g., vendor ID, product ID, serial number, and the like, to the host computing device. When the host computing device sends a command to the attached USB device, mediation module 50 may translate, or reflect the command downstream to the attached USB device. Moreover, when the attached USB device sends a command to the host computing device, mediation module 50 may translate, or reflect the command upstream to the host computing device.

According to some aspects of the disclosure, mediation module 50 may present an authorized connected USB device to the host computing device as a composite device. That is, for example, mediation module 50 may generate and present a composite that consists of the attached USB device, as well as a mediation module 50 USB HID interface. In this example, host computing device can communicate with both mediation module 50 and the attached USB device. If the attached USB device is disconnected, mediation module 50 may also disconnect from the host computing device. Mediation module 50 may then reconnect and present itself to the host computing device, as described above.

As noted above, mediation module 50 may act as a proxy for all messages and commands sent between the host computing device and the attached USB device. For example, mediation module 50 may operate as a proxy to receive messages from a USB device as a USB host via USB host interface 56, and present the messages to a host computing device as a USB device via USB device interface 54. In addition, mediation module 50 may operate as a proxy to receive messages from a host computing device as a USB device via USB device interface 54, and present the messages to a USB device as a USB host via USB host interface 56. Accordingly, mediation module 50 may perform real-time monitoring and checking of the attached device's USB descriptors and filter potentially dangerous commands. For example, one known way for a USB device to interfere with the proper operation of a host computing device (e.g., initiate that "blue screen" of a computing device using the Windows® operating system) is for an HID USB device (e.g., a keyboard, a mouse, and the like) to return incorrectly formatted report data to the host computing device. In this example, mediation module 50 may always present an ideal HID USB device to the host computing device, while also checking and handling malformed or incorrectly processed commands.

According to aspects of this disclosure, mediation module 50 may perform the techniques and examples of this disclosure for a variety of USB devices. Some examples include mass storage class devices (e.g., including optional write-blocking features), HID class devices, printer class devices, and audio class devices (e.g., audio headsets and microphones). In addition, mediation module 50 may be compatible with other USB devices including communications device class (CDC), video devices (e.g., webcams), imaging devices (e.g., cameras or scanners), handheld devices (e.g., personal media players (PMP), gaming consoles, mobile communications devices), and other USB devices (e.g., a wireless dongle, a FLEXlm licensing dongle, and the like).

In some examples, mediation module 50 may specifically exclude some classes of devices, such as USB hubs. For example, USB hubs may interfere with the operation of mediation module 50 and may be categorically restricted, such that when a USB hub is connected to mediation module 50, mediation module 50 disables the hub and notifies a user of the computing device that an unauthorized device is attached to mediation module 50. In some examples, mediation module 50 may disable USB hubs that are integrated into other USB devices (e.g., referred to as a compound device), but enable the devices themselves. For example, mediation module 50 may support a keyboard that includes a keyboard controller behind an embedded hub, but disable any downstream USB ports associated with the hub portion.

In some examples, mediation module 50 may maintain an event log. For example, as noted above, configuration module 96 may identify events that are recorded in an event log stored on memory 92. According to some aspects of the disclosure, configuration module 96 may maintain a timer that is initialized at power up. Configuration module 96 may then log events in a circular buffer. Configuration module 96 may log a variety of operational events including, for example, rules updates, USB device attach and detach events, and error/denial of service/forced shut off events.

According to some aspects of the disclosure, the event log access and write permissions may vary depending on the client. In an example, the event log may be accessed by any client (e.g., untrusted and trusted alike). To delete or download entries from event log, however, a trusted client (e.g., a system administrator or other user that can be verified using an encrypted key) may be required. In addition, to delete or download entries from event log, modification module 50 may have to be in a configuration mode initiated at power up.

Figure 3:
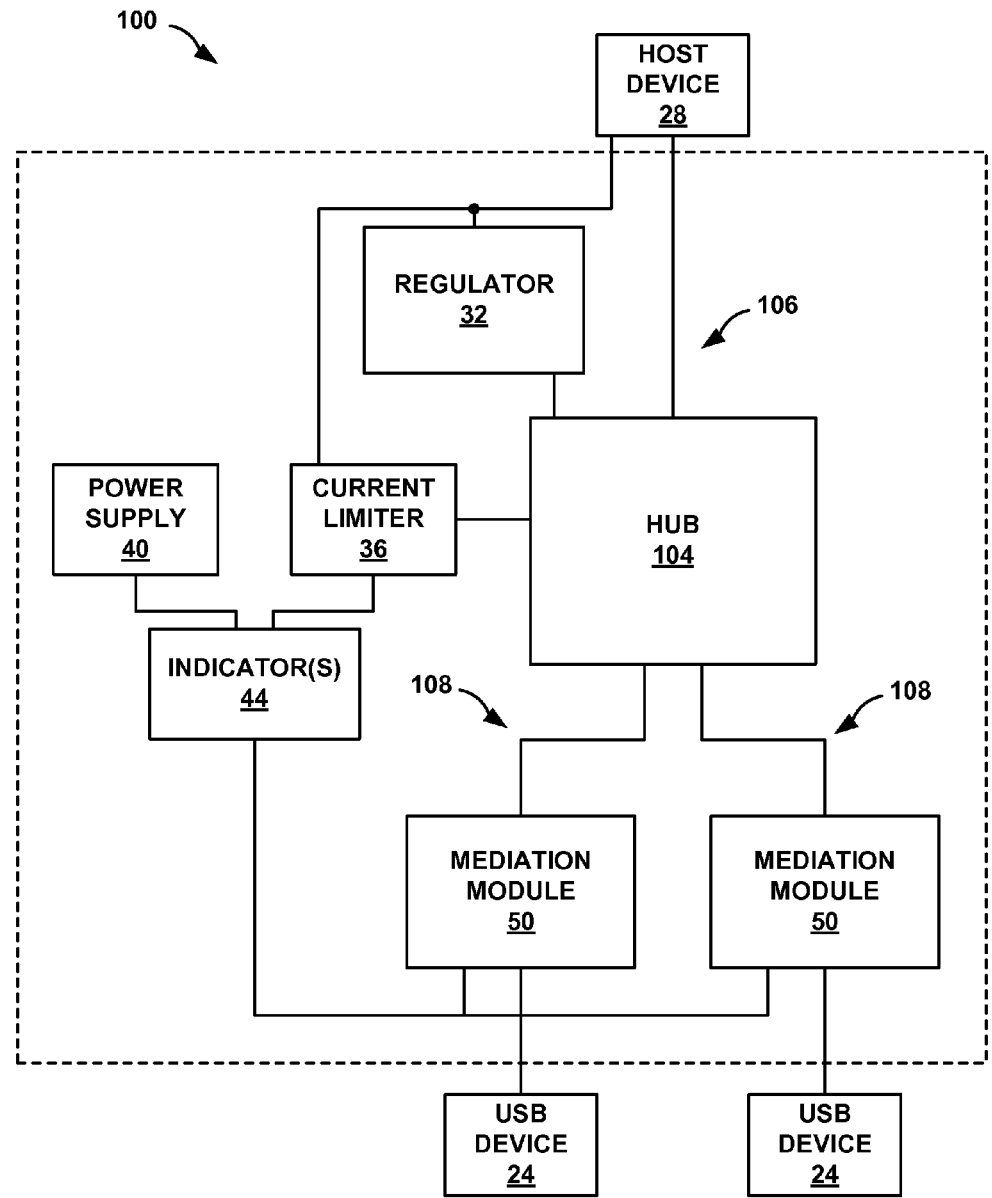
FIG. 3 is a block diagram illustrating still another example system for mediating communication between one or more USB devices and a host computing device, in accordance with one example of this disclosure.

FIG. 3 is a block diagram illustrating another example system 100 for mediating communication between one or more USB devices 24 and a host computing device 28, in accordance with one example of this disclosure. According to some aspects of this disclosure, certain features and components of system 100 may be similar to those shown and described with respect to FIGS. 1-2, with like-components having the same numbers. Thus, it should be understood that the techniques for mediating communication described with respect to FIG. 3 may be performed by a variety of other systems, having more or fewer components than those shown in FIG. 3.

In the example shown in FIG. 3, the system 100 includes regulator 32, current limiter 36, power supply 40, and one or more indicators 44, and two mediation modules 50. In addition, system 100 includes a hub 104. In other examples, system 100 may include more or fewer components than those shown in FIG. 3. For example, in another example, system 100 may include one or more isolation modules, such as isolation module 48 (FIG. 1). Additionally or alternatively, system 100 may not include power supply 40. Other variations are also possible.

Hub 104 supports connection of more than one USB device 24. That is, for example, hub 104 has a single upstream connection 106 for connecting to host device 28, and multiple downstream connections 108 for connecting to multiple USB devices 24. In the example shown in FIG. 3, each of the downstream connections 108 includes a separate mediation module 50. Thus, system 100 can separately and simultaneously mediate communication between each USB device 24 and host device 28. That is, system 100 may perform any or all of the mediating techniques shown and described with respect to FIGS. 1 and 2 for each connected USB device 24.

While FIG. 3 illustrates each connection 108 having a separate mediation module 50, according to some aspects of the disclosure, mediation modules 50 may share certain common components. For example, mediation modules 50 may share a single boot loader 90, memory 92, and/or configuration module 96.

Figure 4:
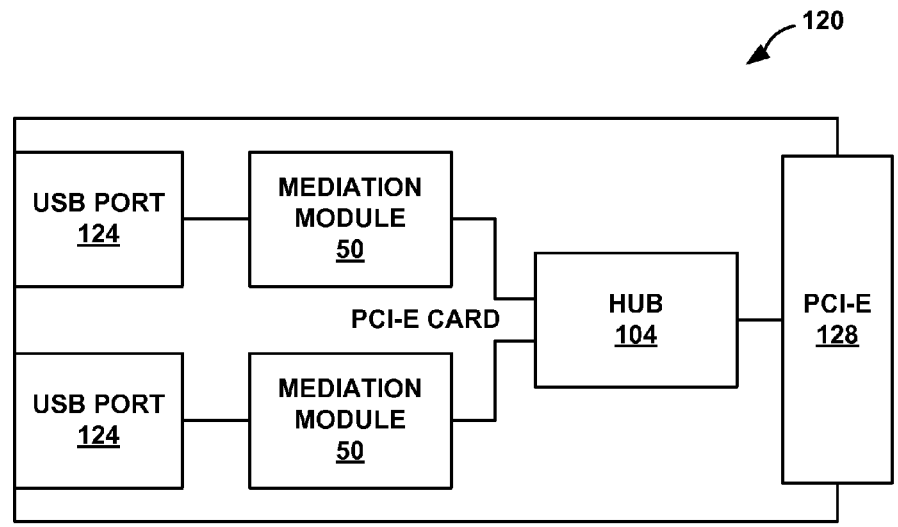
FIG. 4 is a block diagram illustrating still another example system for mediating communication between one or more USB devices and a host computing device, in accordance with one example of this disclosure.

FIG. 4 is a block diagram illustrating another example system 120 for mediating communication between one or more USB devices and a host computing device, in accordance with one example of this disclosure. According to some aspects of this disclosure, certain features and components of system 120 may be similar to those shown and described with respect to FIGS. 1-3, with like-components having the same numbers. Thus, it should be understood that the techniques for mediating communication described with respect to FIG. 4 may be performed by a variety of other systems, having more or fewer components than those shown in FIG. 4.

In the example shown in FIG. 4, system 120 includes two mediation modules 50, a hub 104, two USB ports 124, and a Peripheral Component Interconnect Express (PCI-E) interface 128. In other examples, however, system 120 may include more or fewer components than those shown in FIG. 4. For example, system 120 may include more than two USB ports 124 associated with hub 104. Each USB port 124 may be configured to receive a USB device, such as USB device 24 shown in FIG. 1. That is, each USB port 124 may be configured as a USB receptacle that is configured to receive a USB plug from a USB device.

According to some aspects of the disclosure, each USB port 124 is connected to a dedicated mediation module 50, which may be configured similarly to those shown in FIG. 1-3. That is, each mediation module 50 may be configured to include any or all of the components and features described with respect to FIGS. 1-3. According to some examples, as noted above with respect to FIG. 3, mediation modules 50 may share certain components, such as boot loader 90, memory 92, and configuration module 96 (FIG. 2).

In general, the example system 120 shown in FIG. 4 may be configured as a peripheral expansion card that may be connected, for example, to a mobile computing device (e.g., a laptop computer). That is, according to some aspects of the disclosure, system 120 may be incorporated into a peripheral card that conforms to the Personal Computer Memory Card International Association's (PCMCIA) ExpressCard standard, such that PCI-E interface 128 may connect to an ExpressCard slot included in a laptop computer.

In this way, system 120 physically positions mediation modules 50 between USB ports 124 and the PCI-E interface 128 that connects to a host computing device, such as host device 28 (FIG. 1). According to some examples of the disclosure, a system administrator may physically disable native USB ports of the host computing device, thereby forcing USB devices to be connected via using system 120.

Figure 5:
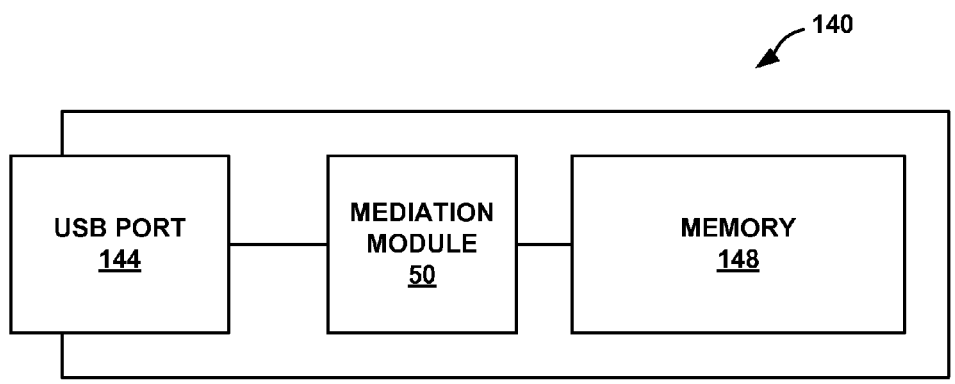
FIG. 5 is a block diagram illustrating still another example system for mediating communication between a USB device and a host computing device, in accordance with one example of this disclosure.

FIG. 5 is a block diagram illustrating another example system 140 for mediating communication between a USB device and a host computing device, in accordance with one example of this disclosure. According to some aspects of this disclosure, certain features and components of system 140 may be similar to those shown and described with respect to FIGS. 1-4, with like-components having the same numbers.

Thus, it should be understood that the techniques for mediating communication described with respect to FIG. 5 may be performed by a variety of other systems, having more or fewer components than those shown in FIG. 5.

In the example shown in FIG. 5, system 140 is configured as a mass storage device that includes a mediation module 50 positioned between a USB port 144 and a memory 148. Mediation module 50 may be configured similarly to those shown in FIG. 1-4. That is, mediation module 50 may be configured to include any or all of the components and features described with respect to FIGS. 1-4.

USB port 144 may be configured to connect to a host computing device, such as host device 28 (FIG. 1). That is, USB port 144 may be configured as a series "A" USB connector that is configured to be connected to host computing device 28. Memory 148 may include a variety of volatile and non-volatile memories for storing data. In an example, memory 148 may be configured as Flash memory, although a variety of other types of read-only memories (ROMs) may also be used.

As noted above, in general, the example system 140 shown in FIG. 4 may be configured as a mass storage device that is connectable to a host computing device, such as host device 28, via USB port 144. According to some aspects of this disclosure, system 140 may include different functionality depending on the host computing device to which system 140 is connected. That is, for example, system 140 may be paired with a "home" host device that includes client software for configuring and/or managing mediation module 50. In this example, system 140 may have full read and write permission. That is, a user may connect system 140 to the home computing device and read files from and write files to memory 148. When system 140 is connected to a host computing device other than the home device, however, mediation module 50 may prevent files to be written to memory 148. In this way, mediation module 50 may protect memory 148 from host-based security attacks (e.g., malware trying to infect the system 140) by making memory 148 read-only.

Figure 6:
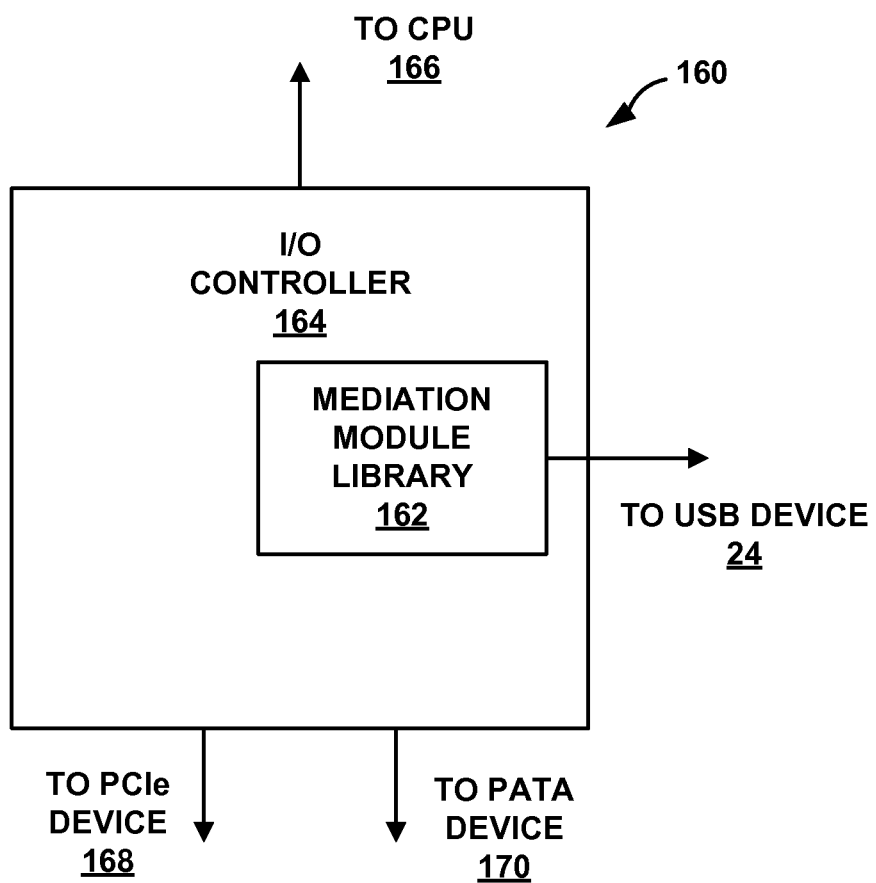
FIG. 6 is a block diagram illustrating still another example system for mediating communication between a USB device and a host computing device, in accordance with one example of this disclosure.

FIG. 6 is a block diagram illustrating another example system 160 for mediating communication between a USB device and a central processing unit (CPU) of a host computing device, in accordance with one example of this disclosure. According to some aspects of this disclosure, certain features and components of system 160 may be similar to those shown and described with respect to FIGS. 1-5. Thus, it should be understood that the techniques for mediating communication described with respect to FIG. 6 may be performed by a variety of other systems, having more or fewer components than those shown in FIG. 6.

In the example shown in FIG. 6, system 160 includes a mediation module library 162 that is integrated into an input/output ("I/O") controller 164. According to some aspects of the disclosure, mediation module library 162 may include logic that carries out the functions ascribed to mediation module 50 shown in FIGS. 1-5. For example, mediation module library 162 may be responsible for determining whether a USB device, such as USB device 24, is authorized to communicate with a CPU 166 of a host device, such as host device 28. Alternatively or additionally, mediation module library 162 may be responsible for determining whether USB device 24 is communicating properly with CPU 166. Other features of mediation module library 162 may also be similar to, or the same as the features described with respect to mediation module 50 shown and described with respect to FIGS. 1-5.

The I/O controller 164 may be used control the flow of data between CPU 166 and I/O devices including USB device 24, a PCI-E device 168, and a parallel ATA ("PATA") device 170.

FIG. 6 is provided as merely an example, and I/O controller 164 may be used to control more or fewer I/O devices than those shown.

According to aspects of this disclosure, mediation module library 162 is directly integrated into I/O controller 164. That is, for example, a manufacturer of I/O controller 164 may integrate mediation module library 162 into hardware or software associated with I/O controller 164 at the time of manufacture. Thus, any computing device that I/O controller 164 may be incorporated in also receives mediation module library 162, and any USB devices 24 connected to I/O controller 164 may be mediated by mediation module library 162.

In the example shown in FIG. 6, mediation module library 162 is incorporated into an input/output (I/O) controller 164. In other examples, however, mediation module library 162 may be incorporated into a variety of other microprocessors, digital signal processors (DSPs), application specific integrated circuits (ASICs), field programmable gate arrays (FPGAs), or any other equivalent integrated or discrete logic circuitry, as well as any combinations of such components. That is, for example, mediation module library 162 may be integrated into USB controller hardware. Thus, a manufacturer of a USB controller, which may be incorporated into a variety of computing devices, can include mediation module library 162 directly into the hardware and/or software that control USB ports.

Figure 7:
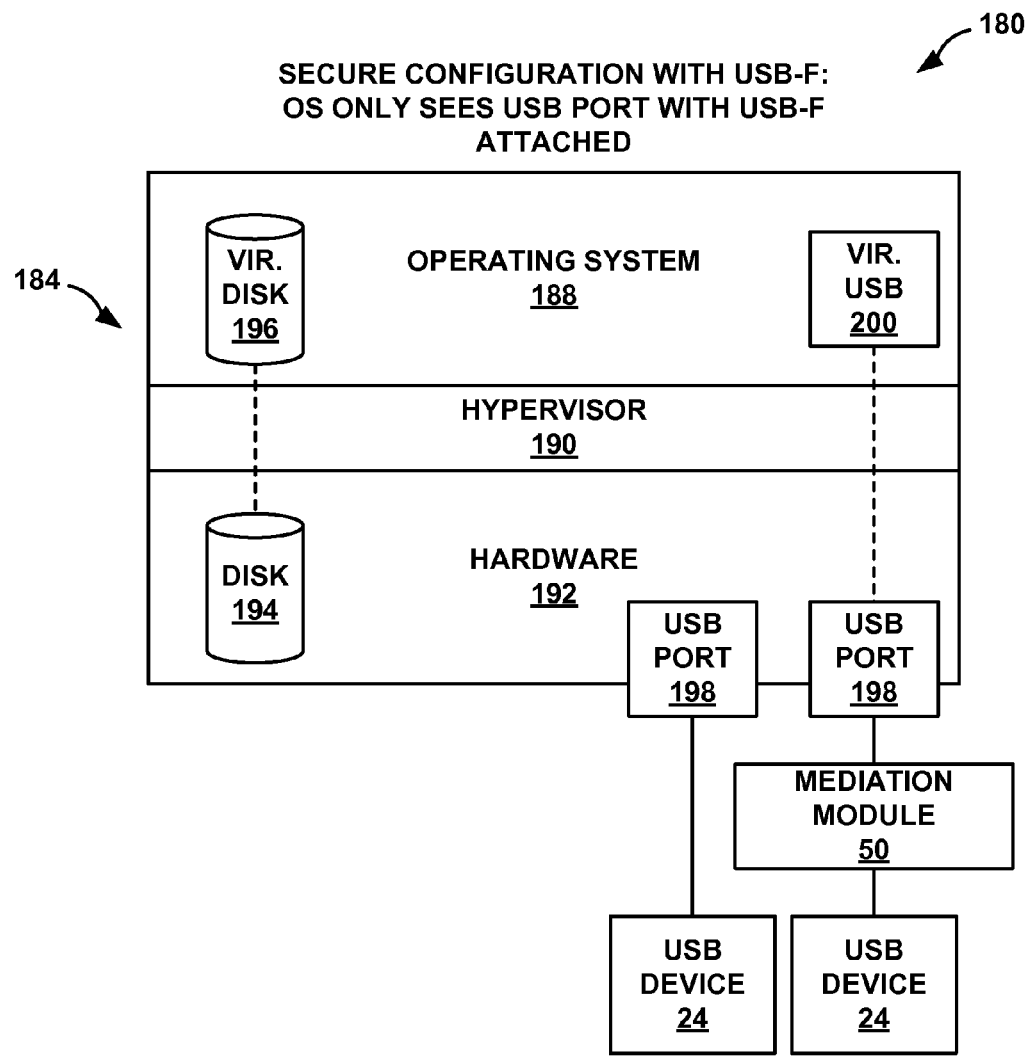
FIG. 7 is a block diagram illustrating still another example system for mediating communication between a USB device and a host computing device, in accordance with one example of this disclosure.

FIG. 7 is a block diagram illustrating another example system 180 for mediating communication between a USB device and a host computing device, in accordance with one example of this disclosure. According to some aspects of this disclosure, certain features and components of system 180 may be similar to those shown and described with respect to FIGS. 1-6. Thus, it should be understood that the techniques for mediating communication described with respect to FIG. 7 may be performed by a variety of other systems, having more or fewer components than those shown in FIG. 7.

In the example shown in FIG. 7, system 180 includes a host computing device 184 having an operating system 188, a hypervisor 190, and hardware 192. Hypervisor 190, which may also be referred to as a virtual machine manager ("VMM") may present a virtualized version of hardware 192 to operating system 188. For example, hypervisor 190 may manage a hard disk 194 (e.g., memory) of hardware 192 by presenting a virtual hard disk 196 to operating system 188. Likewise, hypervisor 190 may manage USB ports 198 of hardware 192 by presenting a virtual USB device 200 to operating system 188.

According to some aspects of the disclosure, certain functions of hypervisor 190 may depend on mediation module 50. In an example, hypervisor 190 may only present a virtual USB device 200 to operating system 188 if the USB device 24 connected to USB port 198 is connected using mediation module 50. That is, hypervisor 190 may not present a USB device 24 to operating system 188 if the USB device 24 is not connected to USB port 198 via mediation module 50. Rather, hypervisor 190 simply ignores the connected USB device 24, such that a user cannot access the USB device 24 using operating system 188.

Figure 8:
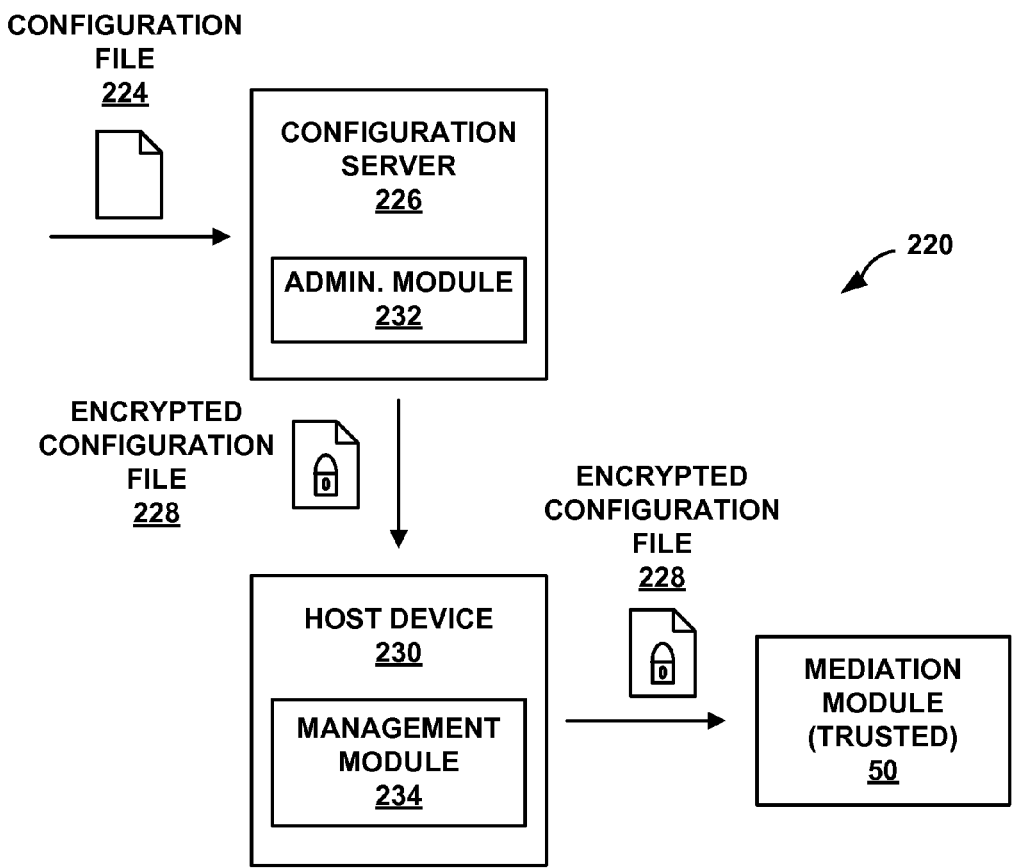
FIG. 8 is a schematic diagram illustrating an example system for configuring a mediation module that may mediate communication between a USB device and a host computing device, in accordance with one example of this disclosure.

FIG. 8 is a schematic diagram illustrating an example system 220 configuring a mediation module that may mediate communication between a USB device and a host computing device, in accordance with one example of this disclosure. According to some aspects of the disclosure, the example system 220 may be implemented to configure mediation module 50 shown in FIGS. 1-5 and 7, or mediation module library 162 shown in FIG. 6, although the system 220 may be used in conjunction with other mediation modules.

In the example shown in FIG. 8, system 220 includes a configuration file 224 that is passed to a trusted configuration server 228. An encrypted version of configuration file 228 is then passed from the configuration server 226 to a host device 230. Host device 230 then passes the encrypted configuration file 228 to mediation module 50. In this way, configuration file 224 may be transmitted from a trusted source, such as a system administrator, to a mediation module 50.

According to some aspects of the disclosure, configuration file 224 may be defined by an end user or system administrator. Configuration file 224 may contain a variety of data, including for example, definitions of which USB devices are authorized to communicate with a particular host device to which mediation module 50 is connected (e.g., one or more lists of identifying characteristics of authorized devices). Configuration file 224 may also include data that allows mediation module 50 to identify malware or other harmful code.

Configuration server 226 may operate an administrative module 232 that is responsible for encrypting configuration file 224. Administrative module 232 may also be responsible for maintaining and managing the encryption keys used to encrypt configuration file 224. Administrative module 232 may be password protected, or may include other security measures to ensure that configuration file 224 and the encryption key to configuration file 224 are not tampered with. In some examples, administrative module 232 may maintain a database that stores a mapping between serial numbers of mediation modules 50 and encryption keys.

According to some aspects of the disclosure, host device 230 may include a management module 234 that includes a management software package delivering encrypted configuration file 228 to mediation module 50. Management module 234 may have a variety of configurations, depending on the end user. For example, management module 234 may be configured in a standard edition, a home edition, and an enterprise edition.

A standard edition management module 234 may allow a user to configure mediation module 50 locally. That is, for example, rather than having administrative module 232 installed on a configuration server 226, as shown in FIG. 8, administrative module 232 may be installed on host device 230 with management module. In this example, management module 234 may work in tandem with a local administrative module 232 to encrypt and deliver an encrypted configuration file 228 to mediation module 50.

A home edition management module 234 may allow a user to configure mediation module 50 using an online service, provided by a trusted administrator. In this example, configuration server 226 may be maintained by a manufacturer or distributor of mediation module 50 and may be accessible via an internet connection. Accordingly, a user of host device 230 can access configuration server 226 using a web-based interface. After receiving an encrypted configuration file 228, management module 234 may provide the encrypted configuration file 228 to mediation module 50.

An enterprise edition management module 234 may support distributed configuration and management of multiple host devices 230. That is, for example, enterprise edition management module 234 may provide remote configuration of a set of host devices 230 connected to a network. In this example, when a mediation module 50 is connected to a host device 230 on the network, the host device 230 may send a message to an administrative module 232 maintained by a system administrator. The administrative module 232 then returns an encrypted configuration file 228 that is specifically tailored for the host device 230 or the user of the host device. According to some aspects of the disclosure, management module 234 may be responsible for transmitting an encrypted configuration file to mediation module 50, as well as updating the configuration file.

According to some aspects of the disclosures, management module 234 also includes device drivers that provide higher-level security features, such as malware scanning of attached USB devices, and provides event notifications to a user of host device 230, such as when a USB device 24 is attached or removed. That is, according to some examples, management module 234 may perform operations intended to protect host device 230 from software and/or protocol based attacks. According to some aspects of this disclosure, management module 234 may protect against protocol attacks (e.g., a denial of service attack), device emulation, and/or malware propagation, as described with respect to FIG. 1. In some examples, such features are optional, and not required for operation of mediation module 50.

Figure 9:
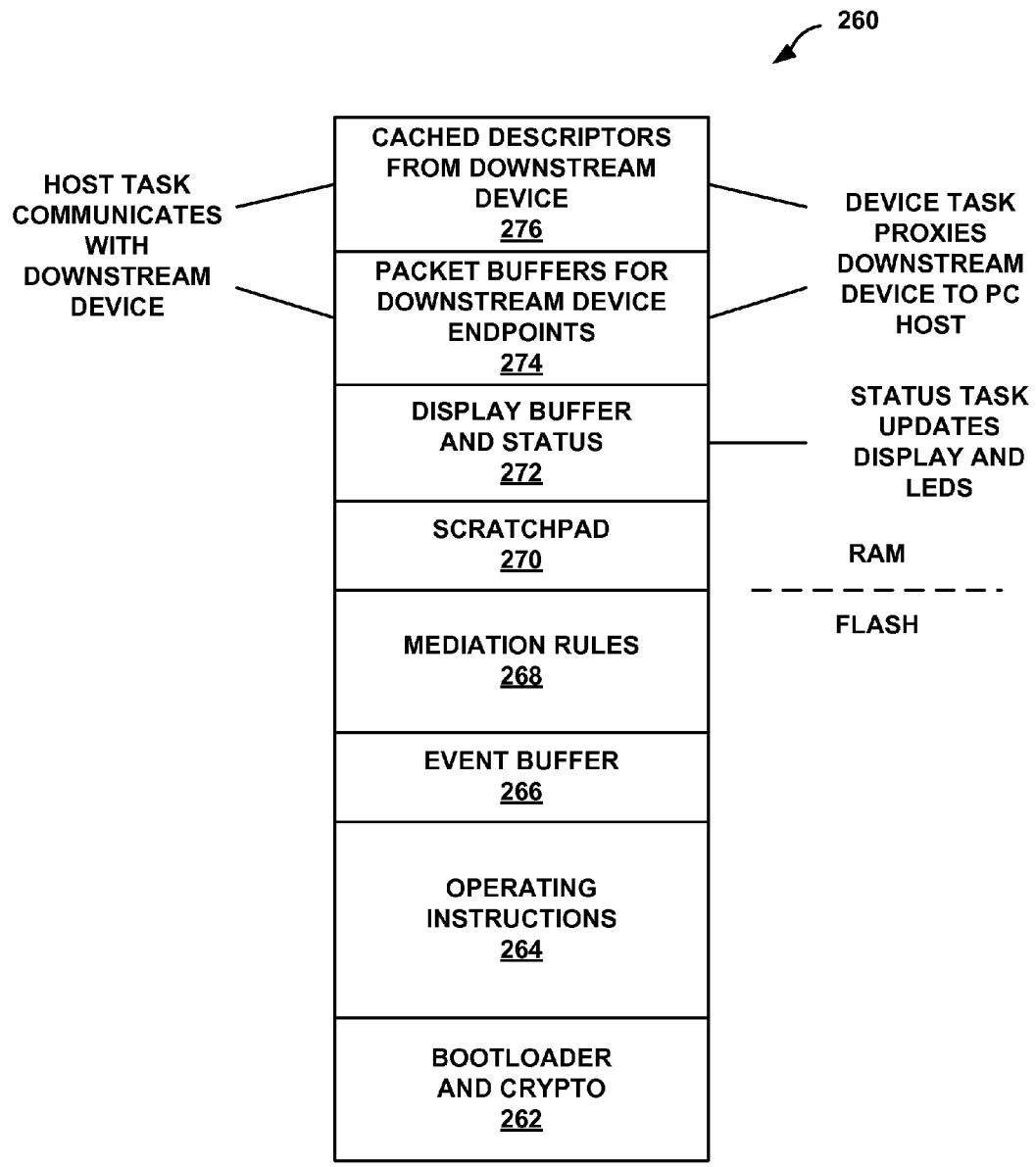
FIG. 9 is a block diagram illustrating an example firmware of a system for mediating communication between a USB device and a host computing device, in accordance with one example of this disclosure.

FIG. 9 is a block diagram illustrating an example firmware 260 of a system for mediating communication between a USB device and a host computing device, in accordance with one example of this disclosure. According to some aspects of the disclosure, firmware 260 may be used by mediation module 50 (FIGS. 1-5 and 7-8), as well as mediation module library 162 (FIG. 6).

In the example shown in FIG. 9, firmware 260 operates using random access memory (RAM), as well as read-only flash memory. For example, firmware 260 includes certain components stored in flash memory, including a boot loader and associated cryptographic data 262, operating instructions 264, an event buffer 266, and mediation rules 268. In addition, firmware 260 includes certain components stored in RAM including a scratchpad 270, display buffer and status data 272, packet buffers for downstream device endpoints 274, and cached descriptors from downstream device 276. It should be understood that the components of firmware 160 shown in FIG. 9 are provided as merely one example. That is, firmware 160 may include fewer, additional, or alternative components than those shown in FIG. 9.

According to some examples, boot loader and associated cryptographic data 262 may correspond to boot loader 90 shown and described with respect to FIG. 2. That is, for example, boot loader and associated cryptographic data 262 may be responsible for boot up operations including checking for a valid operating firmware and passing control to operating instructions 264.

Operating instructions 264 may include programs and/or data structures for performing the mediating functions described herein. For example, operating instructions 264 may carry out certain functions ascribed to mediation module 50, such as determining whether a USB device 24 is authorized to communicate with host device 28, and/or whether a USB device 24 is properly communicating with host device 28.

Event buffer 266 may include the event log described with respect to FIG. 2. That is, for example, event buffer 266 may be configured as a circular event log that tracks certain operating events. In some examples, event buffer 266 may store events related to rules updates (e.g., updates to mediation rules 268), USB device attach and detach events, and error/denial of service/forced shut off events. According to some aspects of the disclosure, events stored in event buffer 266 may include a time stamp to indicate when the events occurred.

Mediation rules 268 may include the rules used by mediation module 50 to determine whether a USB device 24 is authorized to communicate with host device 28, and/or whether a USB device 24 is properly communicating with host device 28. According to some aspects of the disclosure, mediation rules 268 may be changed or updated with a configuration file (FIG. 8).

The remaining components of firmware 260 may be used by mediation module 50 during operation. For example, scratchpad 270 may be a relatively high speed memory used for temporary storage of calculations, data, and other work in progress. Display buffer and status data 272 may be used to provide one or more indications to a user regarding the operational status of mediation module 50, host device 28, and/or USB device 24. In some examples, display buffer and status data 272 may be associated with indicators 44 (FIG. 1).

Packet buffers 274 may be used to buffer data being transmitted between USB device 24 and host device 28, while cached descriptors 276 may be used to determine whether a particular USB device 24 is authorized to communicate with host device 28. Again, it should be understood that firmware 160 is provided as merely one example, and that firmware for mediation module may include fewer, additional, or alternative components than those shown in FIG. 9.

Figure 10:
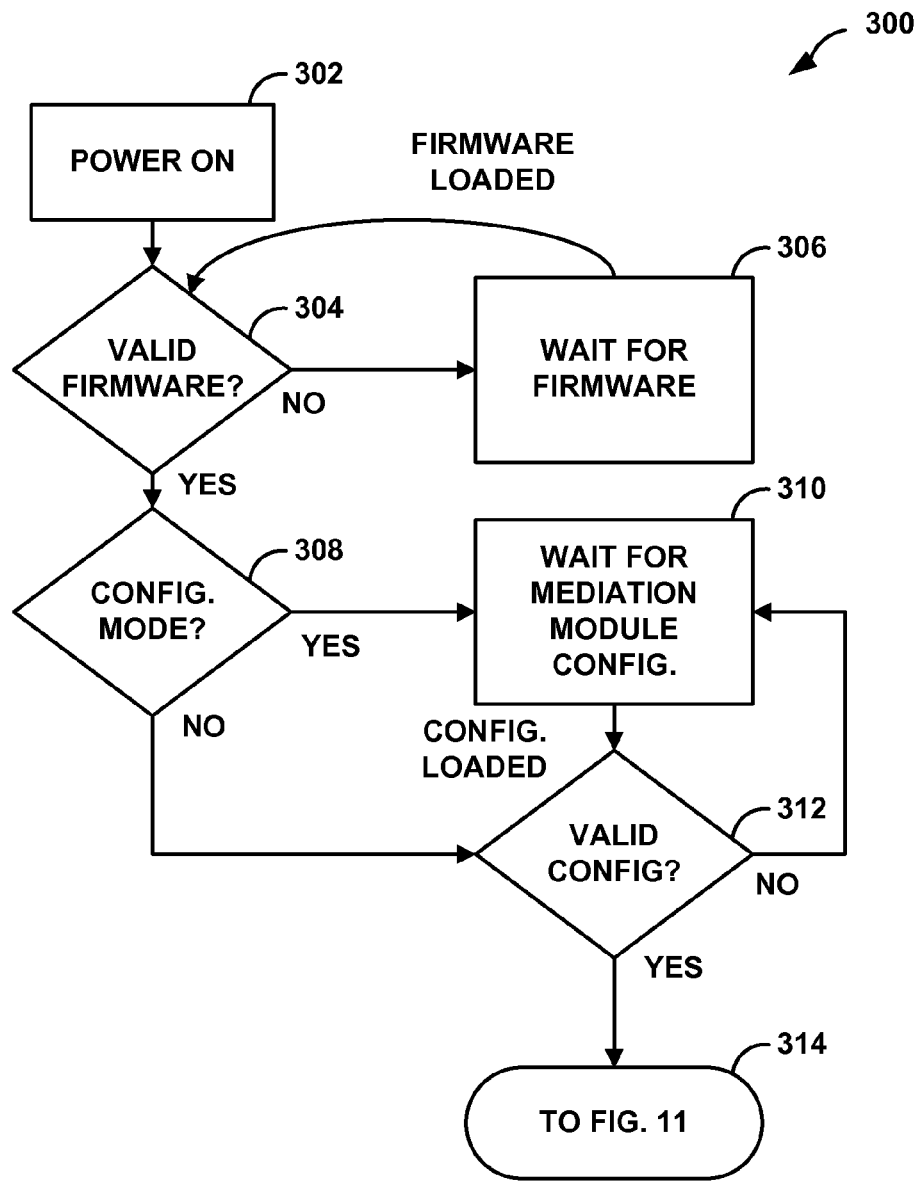
FIG. 10 is a flow diagram illustrating an example configuration operation of a system for mediating communication between a USB device and a host computing device, in accordance with one example of this disclosure.

FIG. 10 is a flow diagram illustrating an example method 300 of configuring a mediation module for mediating communication between a USB device and a host computing device, in accordance with one example of this disclosure. Although generally described as performed by the apparatus 20 and mediation module 50 shown in FIGS. 1 and 2 for purposes of explanation, it should be understood that other systems (e.g., mediation module library 162 shown in FIG. 6) may also be configured to perform the method of FIG. 10.

According to the example shown in FIG. 10, method 300 begins by providing power to mediation module 50 (302). According to some aspects of the disclosure, upon power up, mediation module 50 initially checks for a valid firmware (304). For example, boot loader 90 may check for a valid operating firmware image to pass control to. If boot loader 90 does not detect a valid firmware image, mediation module 50 may wait for valid firmware to be loaded (306). That is, mediation module 50 may connect to host device 28 as an HID device and wait for a user to download a valid firmware.

Upon boot loader 90 detecting a valid firmware image (the "yes" branch of 304), mediation module 50 determines whether a configuration mode has been initiated (308). In some examples, a configuration mode can be used to load configuration files into mediation module 50. Mediation module 50 may determine whether a configuration mode has been initiated by determining if a user has booted mediation module while pressing pushbutton 76 (FIG. 1). In another example, mediation module 50 may determine whether a configuration mode has been initiated by determining whether host device 28 has initiated a configuration mode.

If a configuration mode is active, mediation module 50 waits for one or more configuration files to be loaded into mediation module 50 (310). Upon loading of one or more configuration files, mediation module 50 may determine whether the configuration files are valid (312). For example, mediation module 50 may determine whether the configuration files are encrypted properly, or may perform other checks to ensure the authenticity of the configuration files. Returning to step 308, if configuration mode is not active, mediation module 50 may proceed directly to step 312 and determine whether configuration files stored on mediation module 50 are valid.

According to some aspects of the disclosure, after verifying that mediation module contains one or more valid configuration files, mediation module 50 is ready to begin mediating communication between a host device 28 and a USB device 24. That is, for example, mediation module 50 may proceed to the method of mediating communication shown and described with respect to FIG. 11 (314).

It should be understood that the steps shown and described with respect to FIG. 10 are provided as merely one example. That is, the steps of the method of FIG. 10 need not necessarily be performed in the order shown in FIG. 10, and fewer, additional, or alternative steps may be performed.

Figure 11:
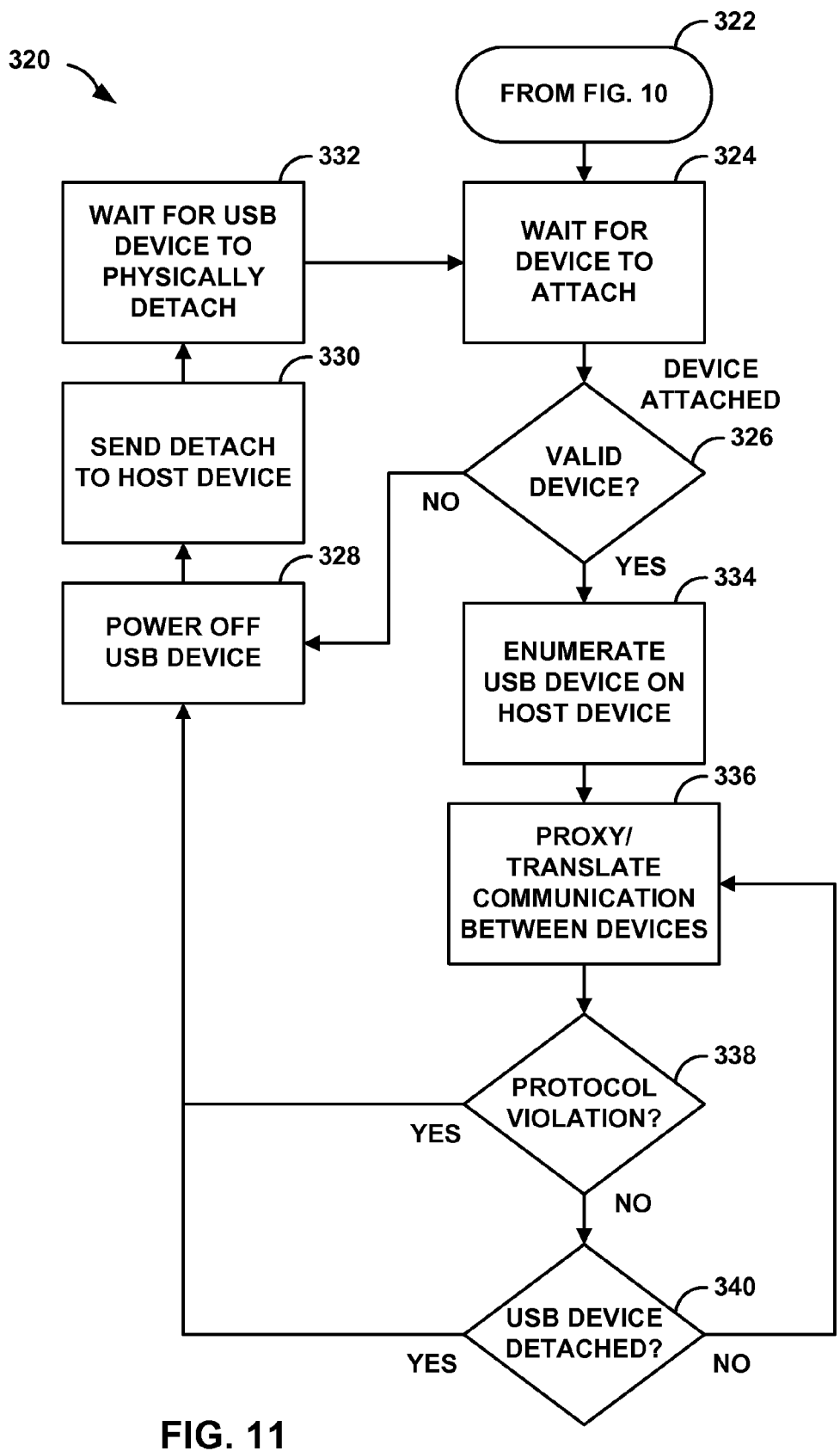
FIG. 11 is a flow diagram illustrating an example operation of a system for mediating communication between a USB device and a host computing device, in accordance with one example of this disclosure.

FIG. 11 is a flow diagram illustrating an example method 320 of mediating communication between a USB device and a host computing device, in accordance with one example of this disclosure. Although generally described as performed by the apparatus 20 and mediation module 50 shown in FIGS. 1 and 2 for purposes of explanation, it should be understood that other systems (e.g., mediation module library 162 shown in FIG. 6) may also be configured to perform the method of FIG. 12.

According to some aspects of the disclosure, method 320 is performed after the configuration method 300 shown and described with respect to FIG. 11 (322). In other examples, method 320 need not follow another method.

Method 320 begins by waiting for a USB device 24 to attach to mediation module 50, for example, via USB host interface 56 (324). After USB device 24 has been attached to mediation module 50, mediation module 50 determines whether the USB device 24 is valid (326). That is, for example, mediation module 50 may determine whether USB device 24 is authorized to communicate with host device 28, as described elsewhere in this disclosure. In an example, mediation module 50 may compare data contained in a descriptor of USB device 24 to authorized descriptors listed in one or more configuration files 94 stored in memory 92.

If mediation module 50 determines that the attached USB device 24 is not valid or is not authorized to communicate with host device 28, mediation module 50 may power off USB device 24 (328). In addition, mediation module 50 may send a message to host device 28 indicating that the attached USB device 24 has been detached (i.e., powered off) (330). In some examples, mediation module 50 may also send a message to host device 28 indicating why the attached USB device was not authorized or to provide other information regarding the attached USB device 24 and/or the operations of mediation module 50. Mediation module 50 may then wait for a user to physically detach the USB device 24 (332). According to some examples, mediation module 50 may determine whether USB device 24 is physically attached by measuring capacitance using isolation module 48 (FIG. 1). After the unauthorized USB device 24 has been detached, mediation module returns to step (324) and waits for a new USB device 24 to attach.

Returning to step (326), if mediation module 50 determines that the attached USB device 24 is valid and authorized to communicate with host device 28, mediation module 50 may enumerate USB device 24 on host device 28 (334). For example, mediation module 50 may present an idealized version of the USB device 24 that is attached to mediation module 50 to the host device 28. That is, if a user connects a storage device, such as a flash drive, to mediation module 50, mediation module 50 may present a storage device with the same descriptors, e.g., vendor ID, product ID, serial number, and the like, to host device 28.

In addition, mediation module 50 may act as a proxy to translate messages and commands between host device 28 and USB device 24 (336). For example, mediation module 50 may translate messages between USB device 24 and host device 28 without altering the contents of the packets that make up the messages. Rather, mediation module 50 may receive messages from the USB device 24 and forward the messages to host device 28. Likewise, mediation module 50 may receive messages from host device 28 and forward the messages to USB device 24. Thus, according to some aspects of the disclosure, the presence and operation of mediation module 50 is transparent to both USB device 24 and host device 28.

While translating commands and messages between host device 28 and USB device 24, mediation module may determine whether the commands and messages include any protocol violations (338). In an example, mediation module 50 may protect host device 28 against protocol attacks from USB device 24, such as eavesdropping, by only forwarding data to a USB device 24 if the data is addressed to USB device 24 by host device 28. That is, USB device 24 is prevented from receiving or copying any data from host device 28 that is not explicitly sent by host device 28 to USB device 24. If mediation module 50 detects a protocol violation, mediation module 50 returns to steps (328)-(332) to disable the USB device 24.

In addition to monitoring commands and messages between host device 28 and USB device 24 for protocol violations, mediation module 50 may also determine whether the USB device 340 has been detached (340). For example, mediation module 50 may determine whether the operating system of host device 28 loses the connection with USB device 24 (e.g., due to an error of the operating system or the USB device 24), or whether the USB device 24 has been physically detached from mediation module 50. If mediation module 50 determines that USB device 24 has been detached, mediation module 50 returns to steps (328)-(332) to disable the USB device 24. Otherwise, mediation module 50 returns to step (336) and continues to translate communication between host device 28 and USB device 24.

It should be understood that the steps shown and described with respect to FIG. 11 are provided as merely one example. That is, the steps of the method of FIG. 11 need not necessarily be performed in the order shown in FIG. 11, and fewer, additional, or alternative steps may be performed.

It should also be understood that the names given to certain units, modules, or components described herein are provided for purposes of example only, and are not necessarily intended to encompass every functional aspect of the units, modules, or components. For example, while certain aspects of this disclosure refer to a "mediation" module, it should be understood that the functional scope of the protection module is not strictly related to providing "protection" for a host computing device from one or more USB devices. That is, for example, it should be understood that the functional scope of the protection module is not strictly related to providing security against rogue USB devices. In some examples, as described above, the protection module may also prevent certain USB devices from communicating with a host computing device due to an administrative decision by a system administrator, regardless of whether such USB devices pose a specific security risk. In an example, a user may implement the protection module to prevent a USB camera device from communicating with a host computing device, regardless of whether the USB camera device poses a specific security risk.

The techniques described in this disclosure, including those attributed to mediation module, or various constituent components, may be implemented, at least in part, in hardware, software, firmware or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure.

Various examples have been described. These and other examples are within the scope of the following claims.

The invention claimed is:

1. An apparatus to mediate communication between a host computing device and a universal serial bus (USB) device, the apparatus comprising:
    a universal serial bus (USB) host interface configured to be connected to a downstream USB device;
    a USB device interface configured to be connected to an upstream host computing device; and
    a mediation module positioned between the USB host interface and the USB device interface and configured to determine whether the USB device is authorized to communicate with the host computing device,
    wherein, after the mediation module determines that the USB device is authorized to communicate with the host computing device, the mediation module is configured to transmit one or more messages between the USB host interface and the USB device interface and to monitor the one or more messages to detect device emulation by the USB device of a device other than the USB device.

2. The apparatus of claim 1, further comprising a memory configured to store a configuration file,
    wherein the configuration file comprises data that identifies one or more authorized USB devices, and
    wherein mediation module uses the configuration file to determine whether the USB device is authorized to communicate with the host computing device.

3. The apparatus of claim 2, wherein the data that identifies one or more authorized USB devices comprises USB descriptor data, and mediation module is configured to compare the USB descriptor data to USB descriptor data received from with the USB device by the USB host interface.

4. The apparatus of claim 1, further comprising an isolation module configured to terminate communication with the USB device when the mediation device determines that the USB device is not authorized to communicate with the host computing device.

5. The apparatus of claim 4, wherein the isolation module is configured to terminate communication with the USB device by removing power from the USB host interface.

6. The apparatus of claim 1, wherein the mediation module is further configured to monitor the one or more messages to detect a protocol violation by the USB device.

7. The apparatus of claim 6, further comprising an isolation module configured to terminate communication with the USB device when the mediation device detects the protocol violation.

8. The apparatus of claim 1, wherein the mediation module is configured to transmit the one or more messages between the USB device and the host computing device without altering the one or more messages such that the USB device and the host computing device are not aware of the presence of the mediation module.

9. The apparatus of claim 1, further comprising an isolation module configured to determine when the USB host interface is connected to the USB device by sensing capacitance at the USB host interface.

10. The apparatus of claim 1, wherein the apparatus is incorporated in at least one of a USB storage device, a peripheral component interconnect (PCI) device, and an Input/Output controller.

11. The apparatus of claim 1, further comprising a memory configured to store an event log, wherein the event log comprises one or more events associated with operation of the mediation module.

12. The apparatus of claim 1, further comprising an isolation module configured to remove power from the USB device when the mediation module determines that the USB device is not authorized to communicate with the host computing device.

13. The apparatus of claim 1, further comprising, when the mediation module determines that the USB device is not authorized to communicate with the host computing device, the mediation module is configured to notify a user that the USB device is not authorized.

14. A method comprising:
receiving, with an apparatus configured to mediate communication between host universal serial bus (USB) interface of a host computing device and a universal serial bus (USB) device, a message from the USB device, wherein when receiving the message the apparatus operates as a host computing device;
determining, with the apparatus, whether the USB device is authorized to communicate with the host computing device based on contents of the message;
after determining the USB device is authorized to communicate with the host computing device, transmitting the message from the apparatus to the host computing device as the USB device; and
monitoring, with the apparatus, the contents of one or more second messages being transmitted between the host computing device and the USB device to detect device emulation by the USB device of a device other than the USB device.

15. The method of claim 14, wherein determining whether the USB device is authorized to communicate with the host computing device comprises comparing descriptor data included in the message to descriptor data of one or more authorized devices.

16. The method of claim 15, further comprising storing a configuration file, wherein the configuration file comprises the descriptor data of the one or more authorized devices.

17. The method of claim 14, further comprising terminating communication with the USB device when the USB device is not authorized to communicate with the host computing device.

18. The method of claim 17, wherein terminating communication comprises removing power from the USB device and discarding the message.

19. The method of claim 14, wherein monitoring the contents of the one or more second messages comprises monitoring the contents of the one or more second messages for a protocol violation by the USB device.

20. The method of claim 19, further comprising terminating communication with the USB device upon detecting a protocol violation.

21. The method of claim 14, wherein transmitting the message to the host computing device comprises transmitting the message without altering the message.

22. The method of claim 14, further comprising notifying a user when the USB device is not authorized to communicate with the host computing device.

23. The method of claim 14, further comprising removing power from the USB device when the USB device is not authorized to communicate with the host computing device.

24. A system comprising:
a universal serial bus (USB) device;
a USB host device;
a USB firewall configured to receive one or more messages from the USB device and determine whether the USB device is authorized to communicate with the USB host device based at least partially on the contents of the one or more messages,
wherein, after the USB firewall determines that the USB device is authorized to communicate with the USB host device, the USB firewall is configured to operate as a proxy to receive the one or more messages as the USB host device, and present the one or more messages to the USB host device as the USB device and to monitor the contents of the one or more messages to detect device emulation by the USB device of a device other than the USB device.

25. The system of claim 24, wherein the USB firewall is configured to determine whether the USB device is authorized to communicate with the USB host device by comparing descriptor data included in the one or more messages to descriptor data of one or more authorized devices.

26. The system of claim 24, wherein, when the USB firewall determines that the USB device is not authorized to communicate with the USB host device, further comprising terminating communication with the USB device.

27. The apparatus of claim 1, wherein the mediation module is configured to operate transparently with respect to the host computing device and the USB device including presenting idealized information associated with the USB device to the host computing device.

28. The apparatus of claim 1, wherein the mediation module is further configured to monitor the one or more messages to detect at least one of malformed packets of the messages, malware packets of the messages, and unexpected packets of the messages.

29. The apparatus of claim 1, wherein monitoring the one or more messages comprises monitoring each message between the USB host interface and the USB device interface.

30. The apparatus of claim 1, further comprising:
one or more second USB host interfaces configured to be connected to one or more second downstream USB devices,
wherein the mediation module is configured to separately determine whether each of the USB device and one or more second USB devices are authorized to communicate with the host computing device, and
wherein, after the mediation module determines that each of the USB device and one or more second USB devices are authorized, the mediation module is configured to transmit one or more messages between the USB host interface and each of the USB device interfaces and to separately monitor at least some of the one or more messages.

31. The apparatus of claim 1, wherein to detect device emulation by the USB device, the mediation module is configured to, after the USB device has been connected to the USB host interface, identify a change in a functionality of the USB device without the USB device being disconnected from the USB host interface.

32. The method of claim 14, wherein detecting device emulation comprises identifying, after the USB device has been connected to the USB host interface, a change in a functionality of the USB device without the USB device being disconnected from the USB host interface.

33. The system of claim 24, wherein to detect device emulation by the USB device, the USB firewall is configured to, after the USB device has been connected to the USB host interface, identify a change in a functionality of the USB device without the USB device being disconnected from the USB host interface.

* * * * *